United States Patent [19]

Kortering

[11] 4,359,248
[45] Nov. 16, 1982

[54] ROADABLE GROUSER FOR TRACK SHOES
[75] Inventor: Randall L. Kortering, Peoria, Ill.
[73] Assignee: Caterpillar Tractor Co., Peoria, Ill.
[21] Appl. No.: 278,506
[22] PCT Filed: Mar. 4, 1981
[86] PCT No.: PCT/US81/00274
    § 371 Date: Mar. 4, 1981
    § 102(e) Date: Mar. 4, 1981
[87] PCT Pub. No.: WO82/03050
    PCT Pub. Date: Sep. 16, 1982
[51] Int. Cl.³ .............................................. B62D 55/28
[52] U.S. Cl. .......................................... 305/46; 305/51
[58] Field of Search ................ 152/176, 185.1, 188, 152/361 R; 305/46, 51, 54

[56] References Cited
U.S. PATENT DOCUMENTS

| | | | |
|---|---|---|---|
| 1,635,596 | 7/1927 | White | 305/54 X |
| 2,345,763 | 4/1944 | Mayne | 305/54 X |
| 2,686,697 | 8/1954 | Baker | 305/10 |
| 2,731,304 | 1/1956 | Kubaugh | 305/51 X |
| 2,869,932 | 1/1959 | Eichweber | 305/10 |
| 3,058,783 | 10/1962 | Wadsworth et al. | 305/51 |
| 3,441,321 | 4/1969 | Darland | 305/35 |
| 3,475,060 | 10/1969 | Kaifesh | 305/46 X |
| 3,666,327 | 5/1972 | Padilla | 305/51 X |
| 4,185,877 | 1/1980 | Tanoue et al. | 305/46 X |

FOREIGN PATENT DOCUMENTS

| | | | |
|---|---|---|---|
| 85466 | 7/1965 | France | 305/54 |
| 54-109844 | 8/1979 | Japan . | |
| 54-111038 | 8/1979 | Japan . | |

*Primary Examiner*—David A. Scherbel
*Attorney, Agent, or Firm*—O. Gordon Pence

[57] ABSTRACT

A roadable track shoe grouser is provided for track-type vehicles, for example, tracked farm tractors, to prevent damage to finished road surfaces when driving such tractors upon such road surfaces. The grouser includes a rubber grouser bar which is bonded to a mounting plate to facilitate replacement of the grouser after the rubber grouser bar is worn out by use. Owing to interruptions in the bond provided to accommodate the heads of track shoe retaining bolts underlying the grouser, the bond is subject to premature failure, resulting in the loss of the rubber grouser bar from the track shoe. The grouser 10 described herein solves this problem by using a mounting plate 32 having an aperture 45, the aperture 45 is of a size to receive a head 28 of a track shoe retaining bolt 25. A plug 50 is of a size and construction to be press fitted into and close the aperture 45 and to provide a continuous, uninterrupted bond interface across the mounting plate 32.

10 Claims, 3 Drawing Figures

U.S. Patent  Nov. 16, 1982  4,359,248
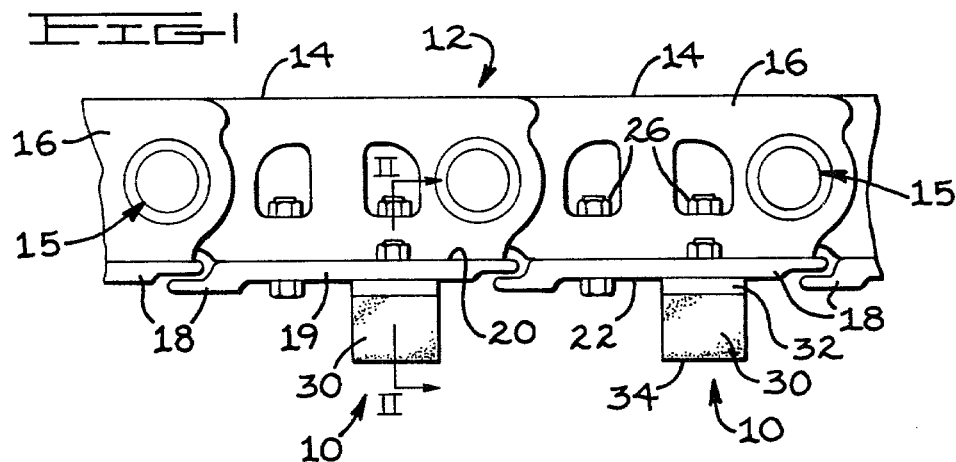
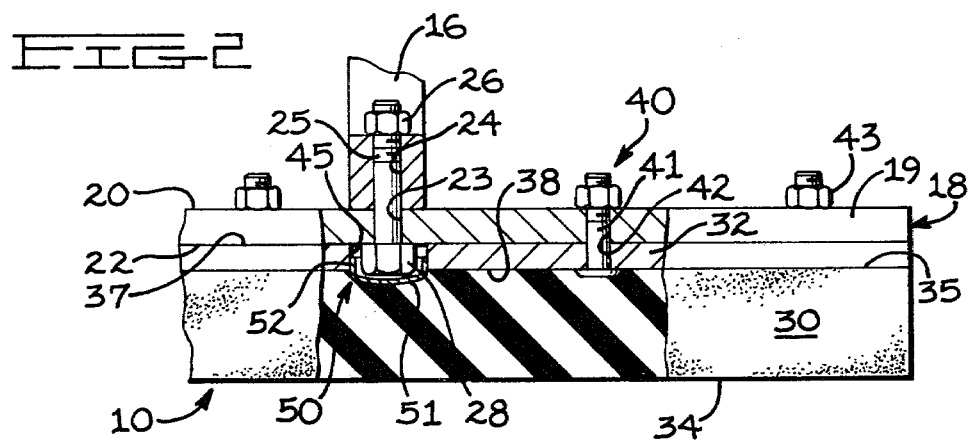
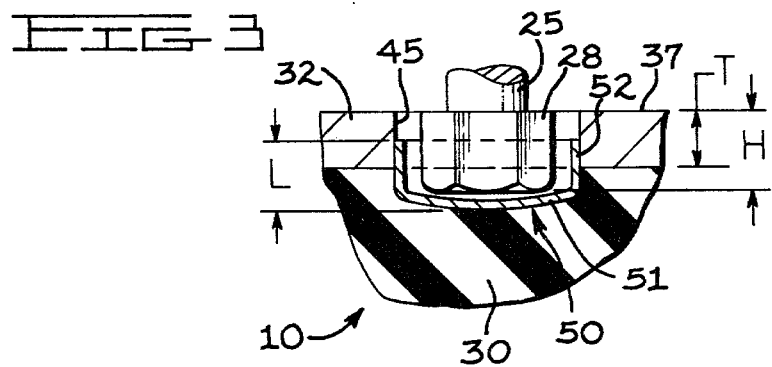

ROADABLE GROUSER FOR TRACK SHOES

DESCRIPTION

1. Technical Field

This invention relates generally to roadable grousers for track shoes and, more particularly, to such grousers having a rubber grouser bar with a mounting plate bonded thereto to facilitate the replacement of the grouser on the track shoe.

2. Background Art

Roadable track shoe grousers are used on track-type vehicles, such as tracked farm tractors and the like, to permit such tractors to cross or travel upon paved roads without damaging the finished surfaces of such roads.

Roadable grousers which provide the tractive effort normally provided by steel grousers are appreciably softer than their steel grouser counterparts and, thus, wear out much more rapidly. Accordingly, to make the use of roadable grousers economically practical, it is necessary that they be readily and inexpensively replaceable.

One method of making such grousers replaceable is by bonding a suitable mounting plate to the underside of the grouser to facilitate the detachable securing thereof to the track shoe by means of conventional threaded fasteners or the like. The use of such a mounting plate, however, is made more difficult on track shoes which are, themselves, retained by bolts to the links of the track chain. This is because track stability and proper ride characteristics dictate where the grouser is located upon the track shoe. Unfortunately, this location encompasses an area in which the track shoe retaining bolts are likewise located.

Thus, in mounting the grouser to the track shoe, one must contend with the problem associated with the head of the track retaining bolts protruding from the outer ground engaging surface of the track shoe. This problem assumes greater importance in connection with another problem which is one of providing the bond between the rubber grouser bar and the mounting plate with sufficient strength to withstand the high stresses it encounters during operation. Such bond failure will result in waste and the premature loss of the rubber grouser bar, causing a loss of traction and possible damage to any finished road surface.

Providing adequate bond strength is difficult to achieve in the first place because of the limited amount of surface area which is available between the grouser bar and the mounting plate. This is because the grouser bar preferably extends substantially the entire length of the track shoe for traction purposes, while being sufficiently narrow to provide the tip pressure necessary to obtain full penetration of the grouser into the soil so as to realize the maximum tractive potential of the grouser. In addition, it is desirable that the mounting plate be as thin as possible in order to maximize the amount of the wearable rubber of the grouser. More rubber height also has the effect of reducing the magnitude of the shear stresses experienced at the bond interface between the rubber and the mounting plate.

Minimizing the thickness of the mounting plate, however, can result in its thickness being less than the height of the head of the track shoe retaining bolt. Thus, the head can protrude into and interfere with the bond interface by requiring that an opening be provided through the plate. Such opening reduces the bond surface area. This opening also introduces additional bond edges. These edges are undesirable because bond separation or failure normally initiates from such edges.

Thus from the foregoing, it is apparent that it would be advantageous to provide a solution to the above problems.

DISCLOSURE OF THE INVENTION

In accordance with one aspect of the present invention, a roadable grouser having a rubber grouser bar with a bonded mounting plate is provided for replaceably detaching the grouser to a track shoe of an endless track chain. The shoe is attached to the links of the track chain by mounting bolts, the heads of which protrude from the ground engaging surface of the track shoe. The mounting plate has apertures therein to receive the bolt heads. The grouser includes means for closing the apertures to provide a continuous, uninterrupted bond interface between the mounting plate and the rubber grouser bar.

An interruption in the bond interface between the grouser and its mounting plate reduces the strength of the bond needed to withstand the stresses experienced by the bond during operation of the grouser in its intended application. In this construction, the interruption reduces the total bond area and introduces additional bond edges along which bond separation initiates.

The present invention provides a solution to this problem by providing means for closing the opening in the bond interface created by the bolt receiving aperture. Thus, the closing means replaces the bond surface area eliminated by the aperture so that the bond interface is continuous and uninterrupted across the mounting plate.

BRIEF DESCRIPTION OF THE DRAWINGS

In the drawings:

FIG. 1 is a fragmentary side elevational view of a portion of an endless track chain equipped with roadable grousers embodying the present invention;

FIG. 2 is an enlarged fragmentary sectional view taken along line II—II of FIG. 1 illustrating a preferred embodiment of the present invention; and FIG. 3 is an enlarged fragmentary sectional view of the grouser similar to FIG. 2, but without the other components of a track chain.

BEST MODE FOR CARRYING OUT THE INVENTION

Referring more particularly to the drawings, a roadable grouser embodying the principles of the present invention is generally indicated at 10 in FIG. 1. The grouser 10 is mounted in a manner hereinafter more fully described to an endless track chain, generally indicated at 12, for driving a track-type vehicle, for example a tracked farm tractor, not shown.

The endless track chain 12 is constructed from a plurality of chain link sections 14. The chain link sections 14 are pivotally interconnected by cooperating pin and bushing assemblies 15. Each chain link section 14 includes a pair of laterally spaced links, one of which is shown at 16 and a track shoe 18. Each track shoe 18 is preferably constructed from a hard, wear resistant material, such as steel, and includes a generally rectangularly shaped flat body 19 having an inner link engaging surface 20 and an opposite outer ground engaging surface 22.

As best shown in FIG. 2, the shoes 18 and links 16 are provided with mating apertures, one of each of which is shown at 23 and 24, respectively. A suitable threaded fastener or bolt 25 is disposed through the mating apertures 23 and 24, which bolt has a nut 26 screw threadably mounted thereon for detachably securing the track shoe 18 to its respective pair of links 16. The bolts 25 have track shoe abutting heads 28 which protrude outwardly from the ground engaging surface 22 of the track shoe 18.

The roadable grouser 10 of the present invention includes an elongated upright grouser bar 30 and a mounting plate 32. The grouser bar 30 is of an elastomeric material, such as rubber. The grouser bar 30 includes an outer ground engaging tip surface 34 and an opposite inner bonding surface 35.

The mounting plate 32 is of a rigid material, preferably a plain carbon steel, and has a generally flat, rectangularly shaped configuration having an outer track shoe mounting surface 37 and an opposite bond surface 38.

The grouser 10 also includes means 40 for replaceably fastening the grouser to the track shoe. Such fastening means preferably includes a plurality of threaded studs 41 connected to the mounting plate 32 and extend outwardly from the outer mounting surface 37. Each stud 41 is preferably received through a mating aperture 42 in the track shoe 18 and has a nut 43 threadably mounted thereon for detachably securing the grouser to the track shoe.

As best shown in FIG. 3, the mounting plate 32 is also provided with an aperture 45. Such aperture is suitably sized to receive the head 28 of the track shoe mounting fastener or bolt 25. The aperture 45 is provided to permit the locating of the grouser 10 on the track shoe 18 in an area providing the proper ride and track stability characteristics, which area likewise encompasses the protruding bolt heads 28 of the track shoe mounting bolts 25.

The grouser 10 of the present invention includes means for closing the aperture 45 between the inner bond surface 35 of the grouser bar 30 and the inner bond surface 38 of the mounting plate 32 for purposes hereinafter more fully described. Such closing means preferably includes a plug 50. The plug 50 preferably has a cup-shaped configuration including a generally circular base portion 51 and an upright annular lip portion 52 which is connected about the periphery of the base portion 51. The lip portion 52 is constructed so as to be press fitted into the aperture 45 for securing the plug 50 to the mounting plate 32.

INDUSTRIAL APPLICABILITY

The roadable grouser 10 of the present invention has general applications on a track-type vehicle and more particularly on a tracked farm tractor which normally operates in undeveloped soil, such as farm fields, but which must also travel upon finished road surfaces in order to get to such fields. To accomplish this, the grouser 10 is provided with a grouser bar 30 of elastomeric material which provides traction in the soil, but will not damage finished road surfaces when the tractor is operated thereon. By way of example, a grouser bar 30 of a natural rubber of the type used in tire treads with a 68 durometer A hardness has been tested with satisfactory results.

The grouser bar 30 is provided with a mounting plate 32 for replaceably detaching the grouser 10 to the track shoe 18 as the rubber grouser bar 30 is subject to a higher wear rate than the other components of the track chain upon which the grouser is used. The mounting bar 32 is bonded by any suitable bonding process known in the art to the inner bond surface 35 of the bar 30. However, before this bonding occurs, the plug 50 is secured in place by press fitting the lip portion 52 thereof into the aperture 45. The lip portion is provided with a sufficient length L to permit the positioning of the circular base portion 51 of the plug 50 outwardly of the inner bond surface 38 of the mounting plate 32. Thus, the mounting plate 32 may have a thickness T which is equal to or less than the height H of the bolt head 28. Accordingly, the thickness of the mounting plate can be kept to a minimum without limitation by the bolt head height.

This enables a greater proportion of the grouser height to be of rubber in order to provide greater wear life and to reduce the stresses at the bond interface.

With the plug 50 thus in place, the mounting plate 32 is preferably bonded to the rubber grouser bar 30 during the molding process of the bar. This permits the rubber to closely conform to the shape of the plug 50. Thus, a continuous, uninterrupted bond interface is provided between the inner bonding surface 35 of the grouser bar 30 and the inner bond surface 38 of the mounting bar 32.

In addition, the plug is of a size and orientation sufficient to position its base portion 51 within a predetermined close distance from the top of the bolt head 28. Such close distance relationship is advantageous in that the plug 50 will be supported by the head 28 to prevent any undue slippage of the plug caused by excessive loads on the grouser 10. If such slippage were allowed to occur, a bond failure about the plug 50 may result.

Other aspects, objects and advantages of this invention can be obtained from a study of the drawings, the disclosure and the appended claims.

I claim:

1. A roadable grouser (10) for a track shoe (18), said shoe (18) having at least one track shoe mounting fastener head (28) protruding outwardly from the track shoe (18), comprising:
   an elongated upright grouser bar (30) of elastomeric material;
   a rigid mounting plate (32) having an aperture (45), said aperture (45) being adapted to receive said fastener head (28), and
   a plug (50) fixedly connected to said mounting plate (32), said plug (50) being of a size and orientation sufficient for closing said aperture (45) and forming a continuous uninterrupted bond interface between said mounting plate (32) and said grouser bar (30).

2. The grouser (10) of claim 1 wherein said plug (50) is press fitted into said aperture (45).

3. The grouser (10) of claim 1 wherein said plug (50) is generally of a cup configuration and includes a circular base portion (51) and an upright annular lip portion (52) extending from the periphery of said base portion (51).

4. The grouser (10) of claim 3 wherein said mounting plate (32) includes an inner bond surface (38) and said lip portion (52) of said plug (50) is press fitted into said aperture (45) with said base portion (51) being disposed adjacent said bond surface (38) of said mounting plate (32).

5. The grouser (10) of claim 4 wherein the mounting plate (32) has a predetermined thickness (T) in the range equal to or less than the height (H) of said protruding fastener head (28) and said lip portion (52) has a predetermined length (L) sufficient for positioning the base portion (51) of the plug outwardly of said bond surface (38) of said mounting plate.

6. The grouser (10) of claim 3 wherein said base portion (51) of said plug (50) is of a size and orientation relative to said fastener head (28) sufficient to maintain said plug (50) at a preselected position with said aperture (45).

7. The grouser (10) of claim 1 including means (40) for replaceably fastening said grouser (10) to said track shoe (18).

8. The grouser (10) of claim 7 wherein said fastening means (40) includes a plurality of threaded studs (41) connected to said mounting plate (32), said studs (41) being positionable through mating openings (42) in said track shoe (18).

9. The grouser (10) of claim 1 wherein the elastomeric material of said grouser bar (30) is rubber.

10. An endless track chain (12) for a tracked vehicle, comprising:
- a rigid track shoe (18) having an outer ground engaging surface (22), said surface (22) having at least one track shoe mounting fastener head (28) protruding therefrom;
- a grouser bar (30) of elastomeric material and having an inner bonding surface (35);
- a mounting plate (32) having an inner bond surface (38) and an aperture (45), said aperture (45) being of a construction sufficient to receive said fastener head (28) within said aperture (45); and
- means (50) for closing said aperture (45) adjacent said inner bond surface (38) and providing a continuous, uninterrupted bond interface between said mounting plate (32) and said grouser bar (30).

* * * * *